US009765612B2

(12) United States Patent
Donderici et al.

(10) Patent No.: US 9,765,612 B2
(45) Date of Patent: Sep. 19, 2017

(54) TIME-FREQUENCY DOMAIN MULTIPLEXING APPARATUS, METHODS, AND SYSTEMS

(71) Applicant: Halliburton Energy Services, Inc., Houston, TX (US)

(72) Inventors: Burkay Donderici, Houston, TX (US); Boguslaw Wiecek, Kingwood, TX (US)

(73) Assignee: Halliburton Energy Service, Inc., Houston, TX (US)

( * ) Notice: Subject to any disclaimer, the term of this patent is extended or adjusted under 35 U.S.C. 154(b) by 0 days.

(21) Appl. No.: 14/650,798

(22) PCT Filed: Dec. 31, 2012

(86) PCT No.: PCT/US2012/072330
§ 371 (c)(1),
(2) Date: Jun. 9, 2015

(87) PCT Pub. No.: WO2014/105090
PCT Pub. Date: Jul. 3, 2014

(65) Prior Publication Data
US 2015/0337649 A1    Nov. 26, 2015

(51) Int. Cl.
*E21B 47/12*    (2012.01)
*H04J 4/00*    (2006.01)
*G01V 3/26*    (2006.01)
*G01V 3/28*    (2006.01)

(52) U.S. Cl.
CPC .............. *E21B 47/12* (2013.01); *G01V 3/26* (2013.01); *H04J 4/00* (2013.01); *G01V 3/28* (2013.01)

(58) Field of Classification Search
None
See application file for complete search history.

(56) References Cited

U.S. PATENT DOCUMENTS

| | | | |
|---|---|---|---|
| 5,051,962 A | * | 9/1991 | Eaton ............... G01V 1/44 181/103 |
| 5,955,884 A | | 9/1999 | Payton et al. |
| 6,670,813 B2 | | 12/2003 | Strack |
| 7,539,279 B2 | | 5/2009 | Lu et al. |

(Continued)

FOREIGN PATENT DOCUMENTS

| | | |
|---|---|---|
| GB | 2372327 A | 8/2002 |
| WO | WO-02/48743 A2 | 6/2002 |

(Continued)

OTHER PUBLICATIONS

"Australian Application Serial No. 2012397818, Response filed Apr. 21, 2016 to First Examiner Report mailed Dec. 21, 2015", 11 pgs.

(Continued)

Primary Examiner — Leon-Viet Nguyen
(74) Attorney, Agent, or Firm — Gilliam IP PLLC

(57) ABSTRACT

In some embodiments, an apparatus and a system, as well as a method and an article, may operate to transmit energy as transmitted signals from current electrodes on a galvanic down hole tool, while multiplexing the energy in both time and frequency domains, to interact the transmitted signals with a geological formation to provide interacted signals that represent a formation property. Additional apparatus, systems, and methods are described.

7 Claims, 15 Drawing Sheets

(56) References Cited

U.S. PATENT DOCUMENTS

| | | | |
|---|---|---|---|
| 8,136,591 | B2 | 3/2012 | Del Campo et al. |
| 8,238,197 | B2 | 8/2012 | Crice et al. |
| 2003/0010492 | A1 | 1/2003 | Hill et al. |
| 2005/0067190 | A1* | 3/2005 | Tabanou .............. G01V 3/24 175/50 |
| 2005/0212520 | A1* | 9/2005 | Homan .............. G01V 3/30 324/338 |
| 2006/0221768 | A1* | 10/2006 | Hall .............. G01V 1/40 367/82 |
| 2010/0148787 | A1 | 6/2010 | Morys et al. |
| 2011/0025335 | A1 | 2/2011 | Itskovich et al. |
| 2011/0085495 | A1 | 4/2011 | Ko et al. |
| 2015/0096827 | A1* | 4/2015 | Li .............. G01V 1/50 181/102 |

FOREIGN PATENT DOCUMENTS

| | | |
|---|---|---|
| WO | WO-2010127121 A2 | 11/2010 |
| WO | WO-2014105090 A1 | 7/2014 |

OTHER PUBLICATIONS

"European Application Serial No. 12890751.6, Office Action mailed Aug. 25, 2015", 2 pgs.

"European Application Serial No. 12890751.6, Reply filed Feb. 27, 2016 to Office Action mailed Aug. 25, 2015", 9 pgs.

"International Application Serial No. PCT/US2012/072330, Response filed Oct. 21, 2014 to Written Opinion mailed Sep. 5, 2013", 3 pgs.

"International Application Serial No. PCT/US2012/072330, International Preliminary Report on Patentability mailed Apr 9, 2015", 7 pgs.

"International Application Serial No. PCT/US2012/072330, International Search Report mailed Sep. 5, 2013", 3 pgs.

"International Application Serial No. PCT/US2012/072330, Written Opinion mailed Sep. 5, 2013", 6 pgs.

"Australian Application Serial No. 2012397818, First Examiner Report mailed Dec. 21, 2015", 3 pgs.

"Canadian Application Serial No. 2,895,026, Office Action mailed Jul. 4, 2016", 4 pgs.

"European Application Serial No. 12890751.6, Extended European Search Report mailed Jul. 5, 2016", 6 pgs.

* cited by examiner

TIME-FREQUENCY DOMAIN MULTIPLEXING APPARATUS, METHODS, AND SYSTEMS

PRIORITY APPLICATIONS

This application is a U.S. National Stage Filing under 35 U.S.C. 371 from International Application No. PCT/US2012/072330, filed on 31 Dec. 2012, which application is incorporated herein by reference in its entirety.

BACKGROUND

Understanding the structure and properties of geological formations can reduce the cost of drilling wells for oil and gas exploration. Measurements made in a borehole (i.e., down hole measurements) are typically performed to attain this understanding, to identify the composition and distribution of material that surrounds the measurement device down hole.

For example, Laterolog and induction resistivity tools can be used to measure the resistivity profile of formations along boreholes to evaluate petrophysical parameters. Following their introduction in 1910-1950's, these tools have evolved and grown more sophisticated, to include the use of sensor arrays. Array tools can produce a radial profile of resistivity, enabling the measurement and correction of borehole and invasion effects. Focusing methodologies that improve resolution vertically and radially can also be implemented.

However, due to the varying distances and focusing mechanisms employed by array tools, the strength of signals at different receivers can differ by orders of magnitude. This leads to special design and operational requirements, including a wide dynamic range. One consideration related to dynamic range is the interference that occurs between different modes (transmitters, components, frequencies) of the tool. Since the level of interference is proportional to the separation between different modes in time or frequency, there is a trade-off between having low-interference and a reduced listening time, which is most noticeable when using low-frequency instruments (e.g., those attached to a Laterolog tool).

DETAILED DESCRIPTION

To address some of the challenges described above, as well as others, apparatus, systems, and methods are described herein that provide reduced interference data acquisition schemes based on time-division multiplexing (TDM) and frequency-division multiplexing (FDM). These schemes help reduce interference between the signals which are generated by multiple transmitters in an array tool.

Figure 1:
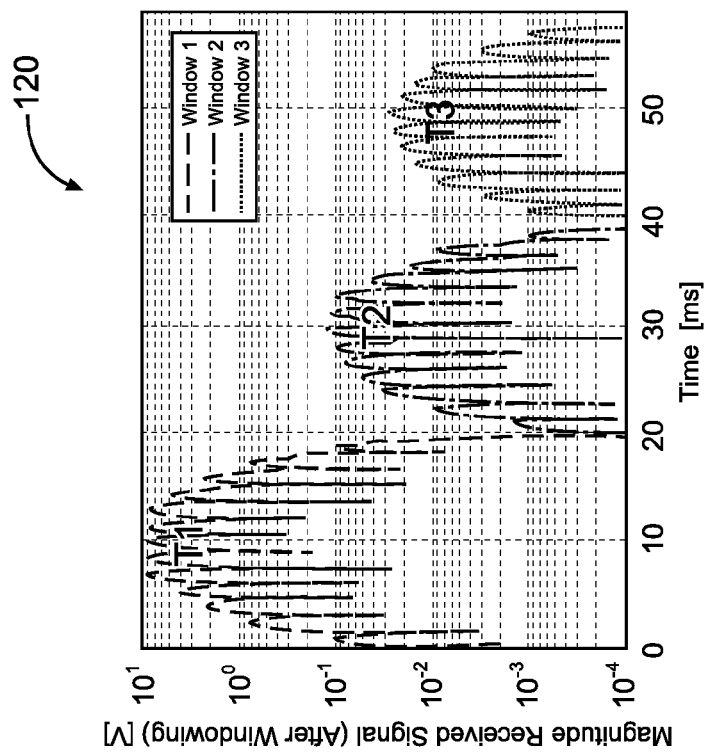
FIG. 1 includes signal reception graphs corresponding to windowed frequency-domain multiplexing (FDM) and time-domain multiplexing (TDM), according to various embodiments of the invention.
Figure 1:
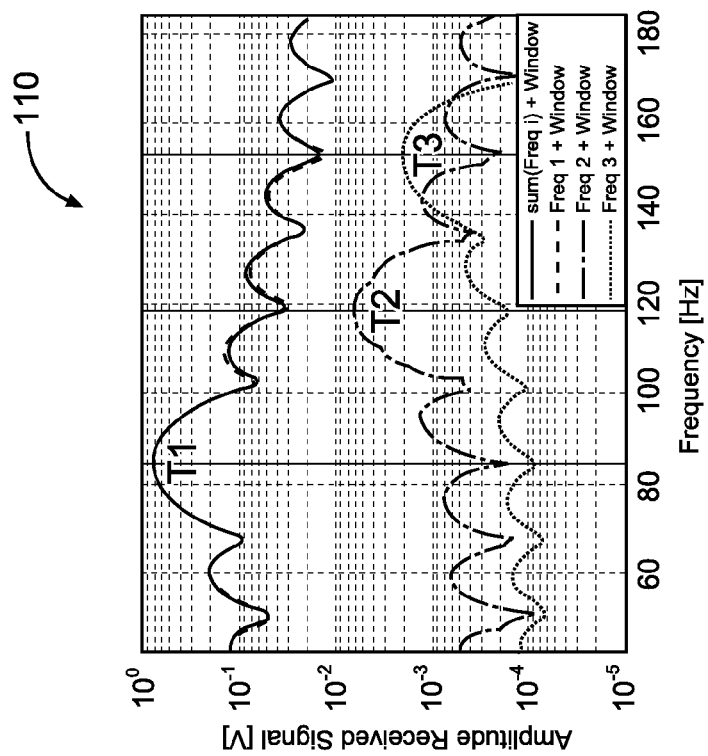

For example, FIG. 1 includes signal reception graphs 110, 120 corresponding to windowed FDM and TDM, according to various embodiments of the invention. Here it can be seen that the signal from transmitter T1 is interfering with the signals from transmitters T2 and T3.

Prior data acquisition methods for Laterolog and other array tools applied analog filters to accomplish simultaneous acquisition of data at different frequencies. This approach produces interference between measurements, most often when long array tools receive high and low amplitude signals within the same data acquisition cycle. Some of the methods proposed herein combine FDM or TDM with the use of a windowed filter that cancels interference. These methods can serve to significantly reduce the interference due to tool movement, amplifier non-linearity, and finite listening time.

For example, in one embodiment, an FDM approach combined with a linear testing window is used to significantly reduce the interference that is present with other types of windows. This can be seen in graph 110, which shows the frequency spectrum of the received signal where each of three transmitter signals is excited separately. In this figure a rectangular sampling window is used to multiply the acquired data samples in the acquisition time range with a rectangular function as wide as the acquisition time range, effectively scaling the signal. In many embodiments, it is useful to fire all transmitters simultaneously to reduce the total time of acquisition, with a different central frequency selected for each transmitter. However, as is evident from the figure, this can lead to the received signal from transmitter T1 dwarfing the received signals from transmitters T2 and T3, making the measurement of the received signals from transmitters T2 and T3 very difficult, if not impossible.

In another embodiment, a TDM-window approach is implemented. This can be seen in graph 120, which shows the received signal as a function of time when each of three transmitter signals is excited at different times. In this figure, a Blackman-Harris sampling window is used to multiply the acquired data samples in the time range associated with each transmitter. The time range for each transmitter in this case is selected to be about one third of the total listening time.

The advantages of the proposed methods are many. They include a reduction in interference when measuring both large and small signals; the potential for reduced listening time; extending the tool operating range to cases where the borehole signal is significantly larger than the formation signal; obtaining higher quality resistivity logs, since borehole effects are reduced; and improving the efficiency of hydrocarbon recovery, due to increased formation evaluation accuracy.

Figure 2C:
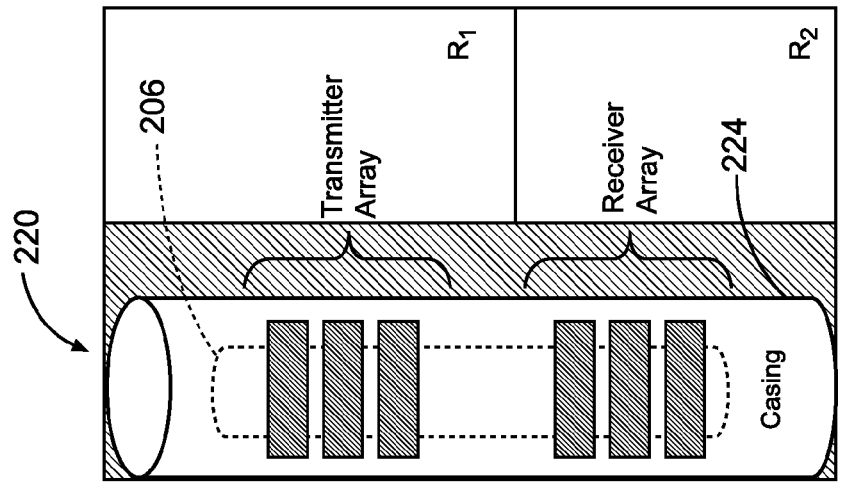
FIGS. 2A-2C are side views of apparatus used in different applications, according to various embodiments of the invention.
Figure 2B:
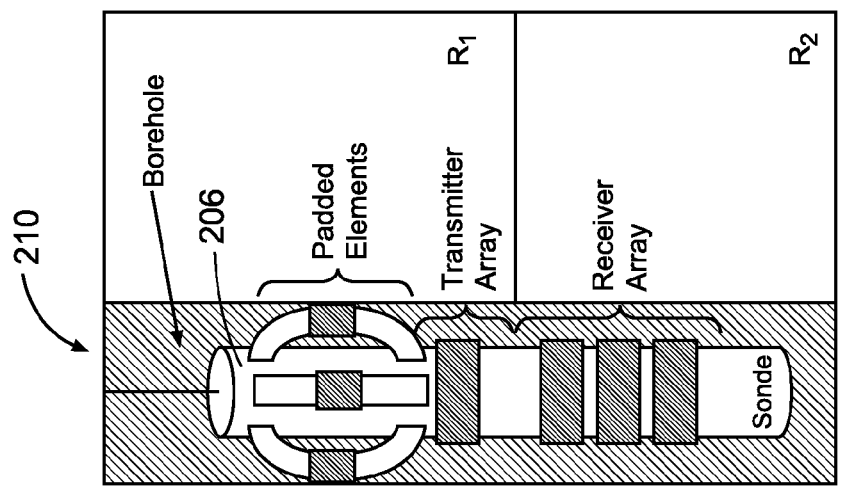
Figure 2A:
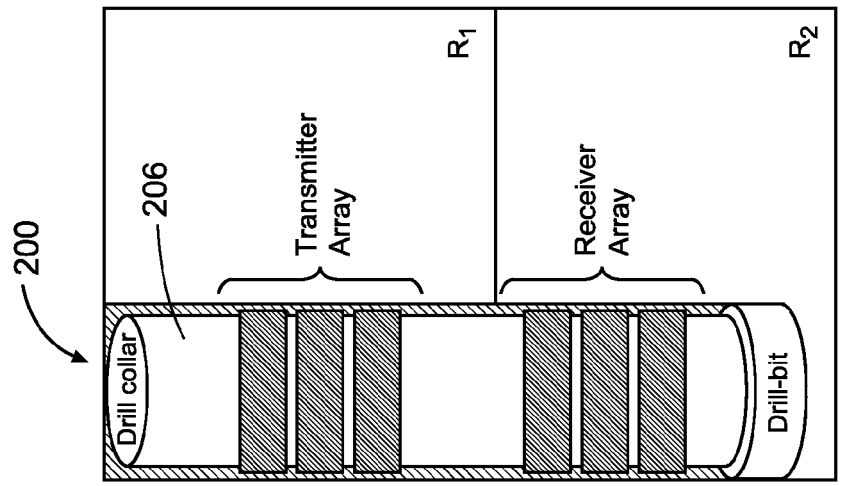

FIGS. 2A-2C are side views of apparatus 200, 210, 220 used in different applications, according to various embodiments of the invention. Thus, various embodiments can be used in logging while drilling (LWD), wireline, and cased-hole applications, with a wide variety of sensor configurations. The tool can be of Laterolog type, induction type, monitoring type, or any other type that operates with different transmitters, frequencies, and modes.

Galvanic tools, such as the Laterolog type, are composed of electrodes which can be represented theoretically as electric monopoles or dipoles, while induction tools can be represented theoretically as magnetic dipoles. In the case of magnetic or electric dipole antenna elements, the directionality of antenna elements can be described, and multiple components can be collocated or staggered based on the mechanical and electrical design of the tool.

In an LWD application, using apparatus 200, sensors may be located inside a non-conducting section of the drill string, or in one or more grooves on the mandrel. In a wireline application, using apparatus 210, sensors can be located on pads for establishing contact with the formation, or they can be located on the sonde. When the sensors are located on the sonde, electrical transmission and reception of signals can be accomplished through the drilling fluid (also known as mud by those of ordinary skill in the art). In a cased-hole application, using apparatus 220, sensors may be located in a tubing string, outside the casing 224, or on the casing 224. In this instance, the housing 206 may comprise a through-casing tool or monitoring array.

Figure 3B:
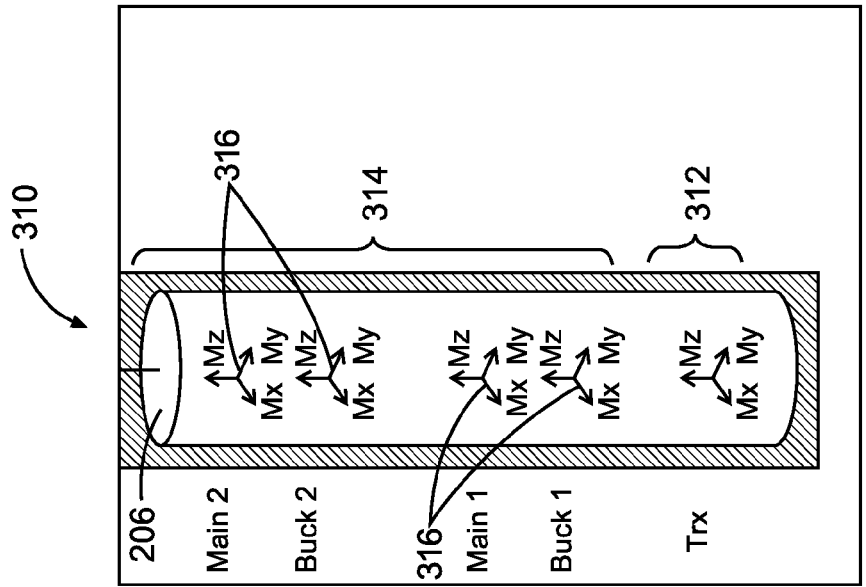
FIGS. 3A-3B are side views of apparatus used in different tool types, according to various embodiments of the invention.
Figure 3A:
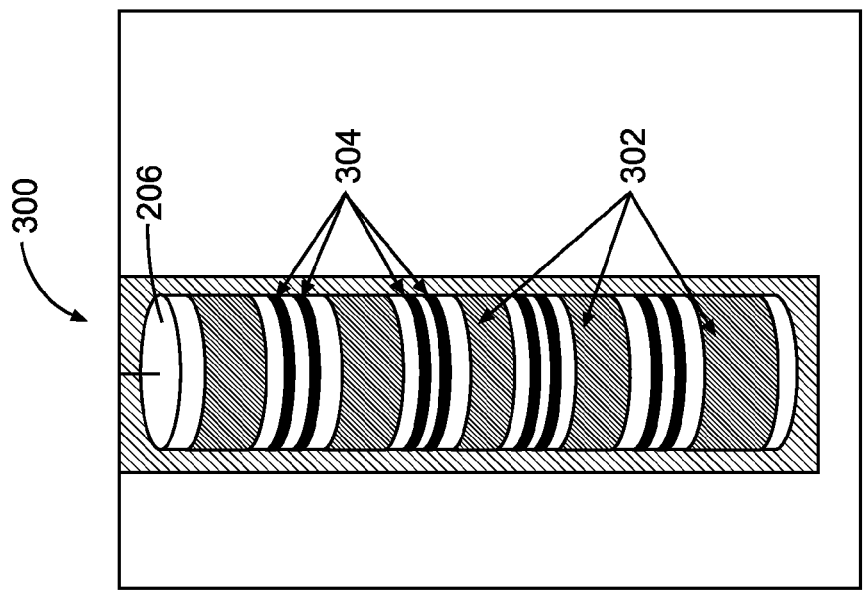

FIGS. 3A-3B are side views of apparatus 300, 310 used in different tool types, according to various embodiments of the invention. Here two common array tools, with their respective complement of sensors, are shown as examples. Those of ordinary skill in the art will realize that other tool types and sensor arrangements can be used, after reviewing the content of this disclosure.

The apparatus 300 comprises a sonde as a housing 206 configured to operate as a Laterolog array tool. A set of axis-symmetric electrodes 302, 304 are attached to the housing 206. The electrodes 302 that are actively controlled in voltage, current or a combination may be designated as current electrodes, and the electrodes 304 that are not directly controlled and used mainly for the measurement of voltages from the current electrodes may be designated as measurement electrodes.

Current electrodes can be considered transmitters of the Laterolog tool based on the discussions above and below. Similarly, the measurement electrodes can be considered receivers of the Laterolog tool.

Current electrodes emit or absorb current, and the level of this current can be adjusted based on a relationship with the measurement electrode voltage levels. Usually, the measurement electrodes operate in pairs, and the voltage within each pair is kept the same to force currents out of the borehole and into the formation. This operation is called "focusing".

When focusing is performed with hardware feedback, it is called hardware-focusing. When adjustments are made to received signals using an algorithm, after the data from all electrodes are collected, this is called software focusing. Software focusing results in simpler hardware construction, and allows the data to be re-processed to determine different features, or to impose quality control in case the results are not satisfactory.

When the borehole is significantly more conductive than the formation, the amplitude of voltages due to different currents can differ by several orders of magnitude. Implementing the concepts introduced herein can help reduce interference between high amplitude and low amplitude modes without sacrificing overall frequency-time bandwidth.

The apparatus 310 comprises a housing 206 that is configured to operate as a multi-component array tool, comprising a transmitter antenna 312 and pairs of receiver antennas 314, where the antenna elements 316 in each pair are electrically connected to each other with opposite polarity. This arrangement, with bucking and main coils, can operate to cancel out unwanted direct coupling between the transmitter antenna 312 and the receiver antennas 314. Using multiple receiver components, as shown for the apparatus 310, can help solve problems associated with anisotropic resistivity values.

As was the case with the apparatus 300, signals that are received at different receiver antennas 314 in the apparatus 310 may also differ by several orders of magnitude, which can make borehole correction difficult, and complicate resistivity inversion algorithms. Again, implementing the concepts introduced herein can help reduce interference between reception modes having widely different amplitudes.

Figure 4:
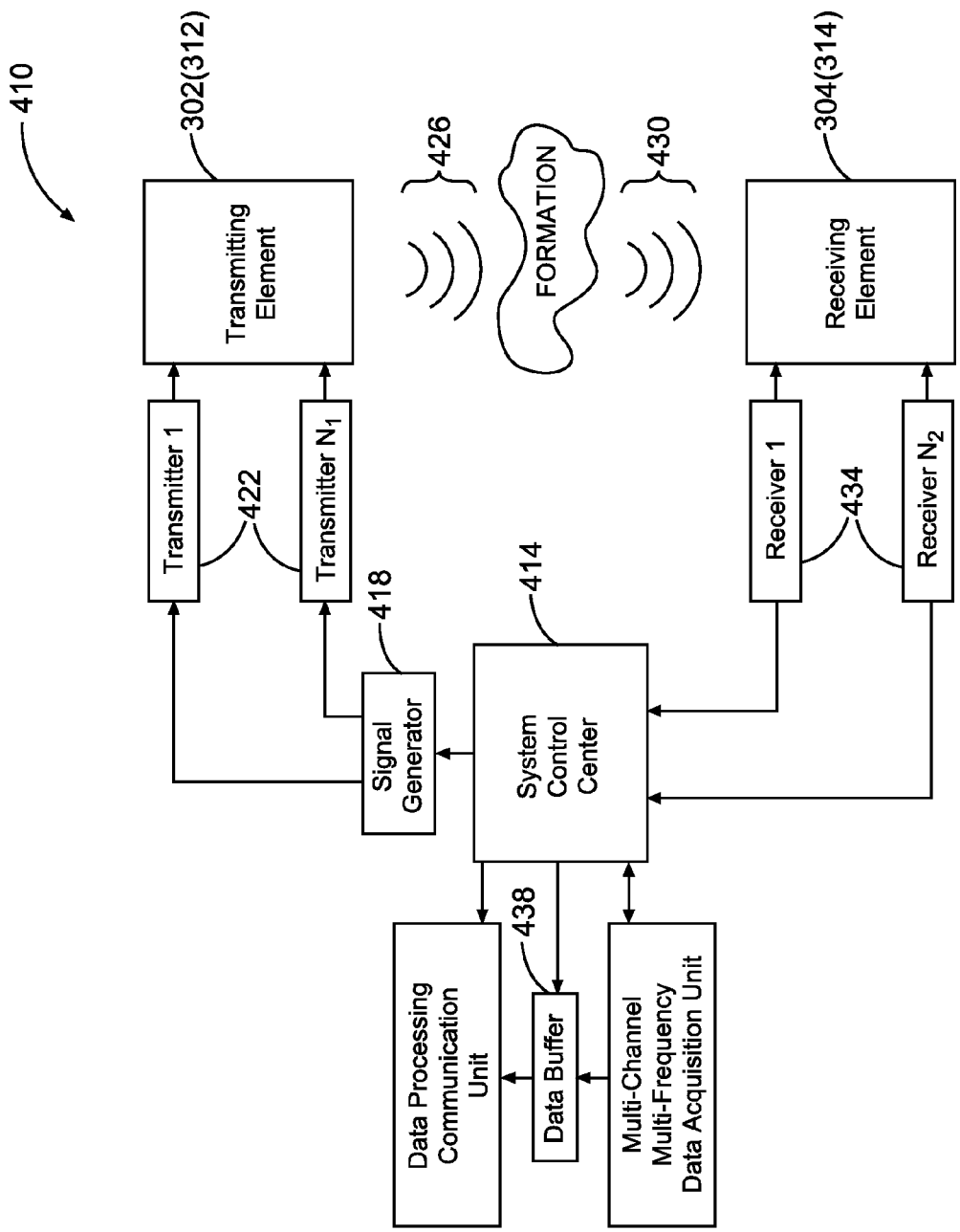
FIG. 4 is a block diagram of a data acquisition system, according to various embodiments of the invention.

FIG. 4 is a block diagram of a data acquisition system 410, according to various embodiments of the invention. Here a system control center 414 activates a signal generator 418 to drive transmitters 422, to produce electromagnetic signals 426 at the current electrodes/transmitter antennas 302, 312, depending on the implementation. Time-controlled pulses in the transmitters 422 are used to generate the signals 426, with the excitation function of each pulse optimized to achieve the desired time-frequency bandwidth utilization and interference reduction.

The electromagnetic signals 426 interact with the formation to produce interacted signals 430, which are received by the measurement electrodes/receiver antennas 304, 314, and the receivers 434. The received data is stored in a data buffer 438 (e.g., a memory) and may be processed down-hole, or communicated to the surface for processing via a telemetry system.

In general, most multiplexing schemes assume adequate synchronization between transmitters and receivers. However, depending on the particular system embodiment that is realized, synchronization may be more or less useful. This is because embodiments that multiplex in frequency may be sensitive to frequency interference effects, while being relatively insensitive to time synchronization. On the other hand, systems that multiplex in time may be sensitive to a lack of synchronization in time, while being relatively insensitive to frequency interference. For example, in the case of an induction tool, a compensated measurement or a ratio measurement can help reduce synchronization requirements. The details of signal generation and data processing that can be used to achieve these results will now be described.

Figure 5:
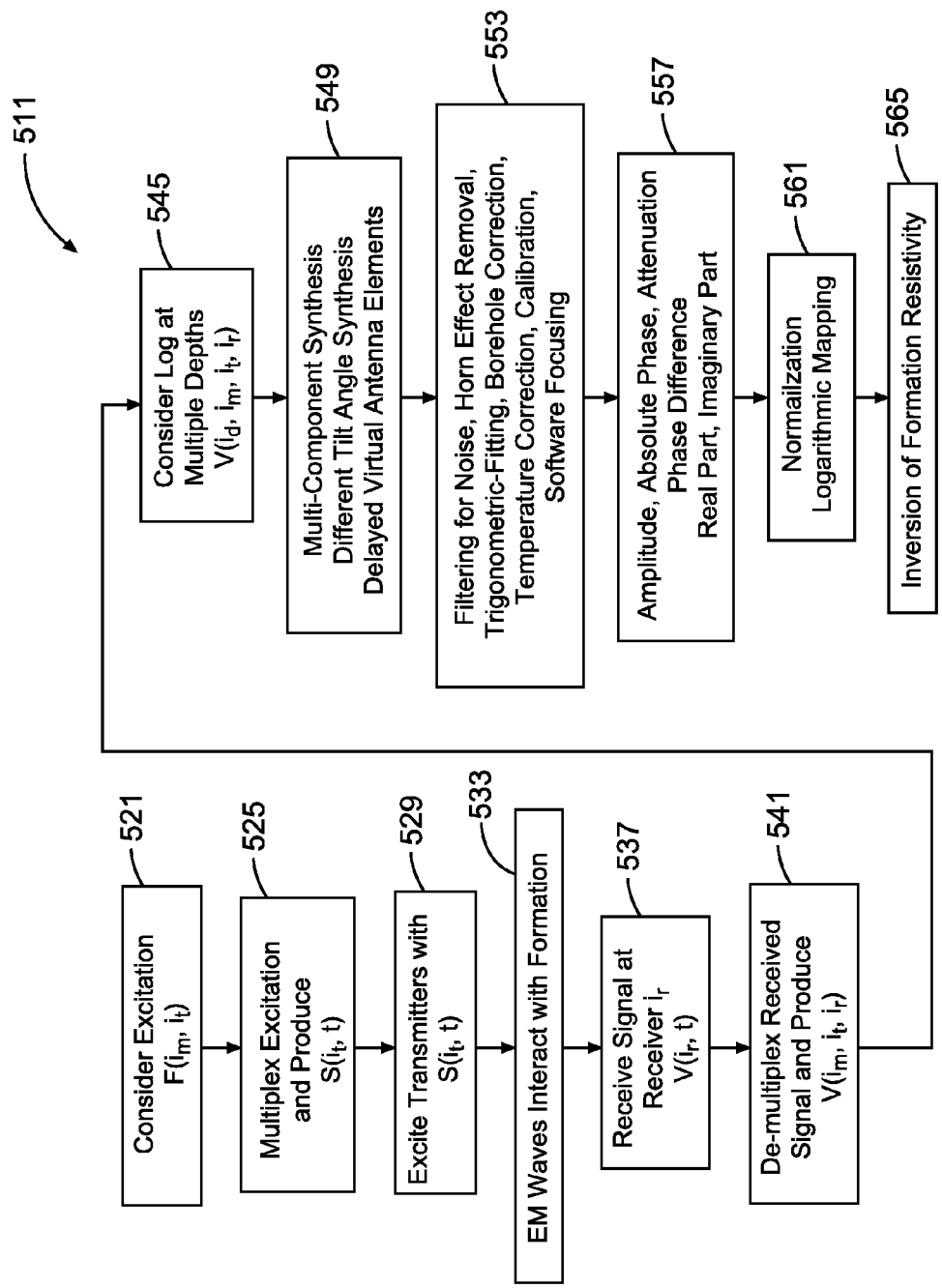
FIG. 5 is a flow diagram of a signal generation and processing scheme, according to various embodiments of the invention.

FIG. 5 is a flow diagram of a signal generation and processing scheme 511, according to various embodiments of the invention. At block 521, it can be seen that the excitation function of each transmitter is determined by multiplexing a set of ideal excitations $F(i_m, i_t)$. These excitations involve different modes $i_m$, and different transmitters $i_t$. The multiplexed signal can therefore be defined by a set of pulses, $S(i_t, t)$, which can be generated at block 525, and delivered by different transmitters at substantially the same time, at block 529. After the resulting electromagnetic waves from the transmitters have interacted with the formation to produce interacted signals at block 533, the interacted signals can be received by the receivers as a function of time at block 537.

A de-multiplexing algorithm that is paired with the original multiplexing algorithm is used to separate out individual measurements, $V(i_m, i_t, i_r)$, associated with each mode $i_m$, transmitter $i_t$, and receiver $i_r$, at block 541.

The log that is obtained by stacking the separated measurements as a function of depth at block 545 can be further processed, as is known to those of ordinary skill in the art. For example, measurements obtained at different tilt angles, tool rotation positions, and times for an LWD tool can be converted to a synthetic configuration of tri-axial responses at block 549.

As is known to those of ordinary skill in the art, at block 553, the data can be passed through filters to remove noise and other undesired artifacts, such as the horn effect, on the measurements. In the case of tool rotation, different azimuthal bins of data can be averaged, or fitted to curves, based on an optimization algorithm to improve the signal-to-noise ratio. A borehole correction may also be desirable under certain circumstances.

If the tool's electrical and mechanical properties drift with temperature, temperature-depth compensation may be accomplished using a correction look-up table from a heat-run test, or by taking ratios of signals that are affected by the temperature in substantially the same way. A tool's properties may also drift due to wear, tear, and fatigue over time. Moreover, certain effects (e.g., due to the mandrel) cannot be predicted ahead of time, or matched using results indicated by computer modeling. Thus, calibration measurements may be useful to account for (and to remove) such effects from the measurement. Software focusing methods can be used to improve the resolution of published images and focus the signal at, or ahead of the bit.

After removing undesired effects at block 553, the complex voltage data may be converted into polar form with amplitude or phase parts at block 557, as is known to those of ordinary skill in the art. It is also possible to express the data in real and imaginary form, where the real part is defined as the signal that is in-phase with the reference, and the imaginary part is defined as the signal that is 90 degrees out of phase with the reference. In some embodiments, the reference may be taken as the transmitter. In the case of signal ratios, phase difference and attenuation may become more relevant and a reference is not used.

As is known to those of ordinary skill in the art, normalization and logarithmic transformation may be applied at block 561 to equalize the contribution of data channels in the inversion process of block 565.

Thus, after the processing of blocks 541-561 is applied, the data may be fed to an optimization algorithm that minimizes the difference between the data and a modeling response by adjusting the model parameters at block 565. The model parameters may include isotropic/anisotropic resistivities of layers, as well as the positions and orientations of layer boundaries. Borehole parameters can also be determined as a by-product. The various inversion algorithms for different types of tools are well known to those of ordinary skill in the art, and will not be described further here.

It should be noted that the order of some of the operations included in the scheme 511 may be different from what is shown in FIG. 5. Furthermore, some of the activities do not exist when the mechanisms described herein are applied to some tools. For example, a galvanic tool may not be configured to measure the phase of electromagnetic fields, since their contribution is expected to be relatively small, producing little in the way of information that directly indicates formation properties. Multiplexing methodologies to reduce frequency interference and improve accuracy will now be described.

Figure 6:
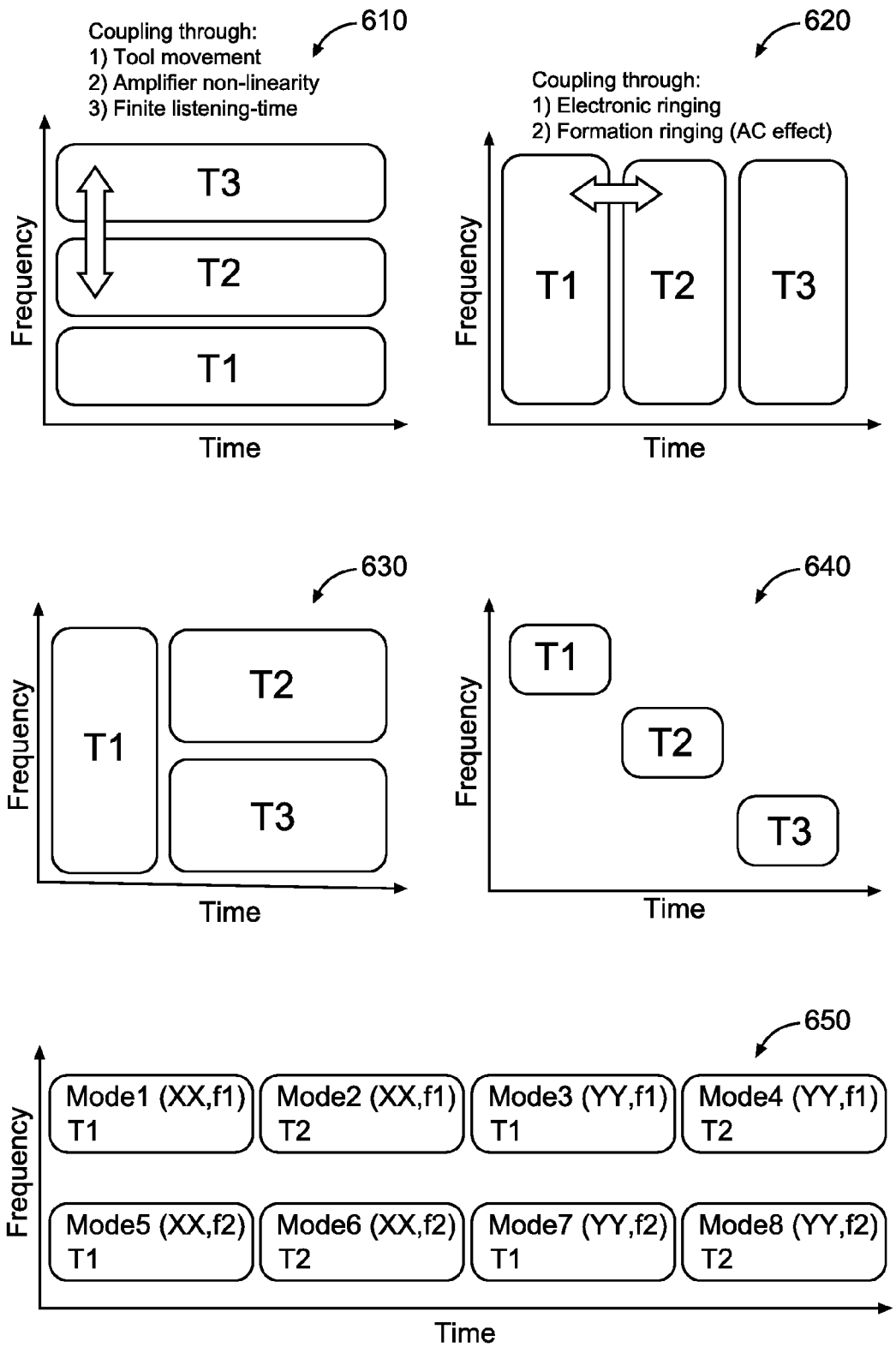
FIG. 6 includes a series of graphs illustrating multiplexing schemes, according to various embodiments of the invention.

FIG. 6 includes a series of graphs 610, 620, 630, 640, 650 illustrating multiplexing schemes, according to various embodiments of the invention. In some embodiments, an electromagnetic tool operates by utilizing different modes (e.g., XX, . . . , ZZ for a multi-component tool), transmitters, and frequencies. In addition to these variations, different receivers may also be used. However since receivers can usually operate simultaneously without much interference, they will not be included in the following discussion. Nevertheless, those of ordinary skill in the art will realize, after reviewing the content of this disclosure, that the multiplexing schemes described herein can be extended for use with different receivers in a straightforward manner.

In order to obtain diverse information related to formations, the apparatus of various embodiments operates with different combinations of modes, transmitters, and frequencies. Thus, a multiplexing scheme provides a convenient mechanism to efficiently occupy the available time/frequency bandwidth.

In many embodiments, the time bandwidth is limited by the desire to obtain a certain number of samples over a given logging distance. Similarly, the frequency bandwidth is limited because certain parameters can only be effectively measured within certain frequency ranges.

For example, a Laterolog tool operates at relatively low frequencies. As a result, the data acquisition window offers relatively few acquisition (listening) periods. On the other hand, there is more freedom with respect to operational frequency, since the physics of the problem are more or less confined to frequencies below a selected cut-off frequency (e.g., in the range 250-1000 Hz).

Considering an induction tool as another example, the operating frequency is higher. Thus, the number of available periods to acquire data within the acquisition window is greater. As a result, the restrictions on time are less than for the Laterolog tool. On the other hand, induction tool physics change substantially with frequency, such that the operational frequencies are more precisely controlled, reducing flexibility with respect to the frequency band of operation. In some embodiments, signal power may also be limited, which can translate into additional time/frequency requirements.

Measurements involving different modes, transmitters, and frequencies have the potential to interfere with each other due to coupling in the formation and limitations of finite and discrete sampling. This interference can increase as frequency or time bands move closer to each other. Different mechanisms that can contribute to this interference will now be discussed.

Interference between operational frequencies can be due to tool movement, amplifier non-linearity, and a finite listening time, among others. Graph 610 shows an FDM scheme, where measurements are made at substantially the same time, at different frequencies. In the figure, T1-T3 represent different transmitters, operating at different frequencies, at substantially the same time.

Interference between different acquisition times may be due to electronics and formation ringing (e.g., alternating current effects), among others. Generally, formation and electronics ringing effects tend to decrease with a decrease in frequency. As a result, the TDM apparatus and systems described herein may be more useful in those conditions. Graph 620 shows a TDM scheme where all three transmitters operate on the same frequency, at different times.

Graph 630 shows a mixed multiplexing scheme, where some measurements are made at the different times, and some measurements are made at the same time, but at different frequencies. This implementation can provide the benefits of both TDM and FDM.

Graph 640 shows a sequential multiplexing scheme where all measurements are made at different times and different frequencies. For the same amplitude of excitation signals, the resulting measurements are expected to have lower signal-to-noise ratio than the implementation associated with graph 630, since the whole time-frequency spectrum is not utilized.

Graph 650 shows an example embodiment with eight measurements, as part of operating a multi-component array induction tool. Here each measurement is a combination of a different mode (e.g., XX or YY), different transmitters T1, T2, and different frequencies $f_1$, $f_2$.

As an example of one embodiment, a more detailed multiplexing scheme for a Laterolog tool will now be described. To begin, it is noted that the pulses provided by each transmitter within a data-acquisition time interval comprise a combination of signals at different frequencies, and different pulse windows. Equation (1) describes how this type of multiplexing can be accomplished in mathematical terms, using N transmitters, integrally indexed as $i_t$, operating at a frequency f and phase $\phi$, within the acquisition time period T:

$$S(i_t, t) = \text{pulsewindow}(t_{i_t}^s, t_{i_t}^e, t)\sin(2\pi f_{i_t} t + \phi_{i_t}) \quad (1)$$

$$t_{i_t}^s = T\frac{i_t - 1}{N_t}$$

$$t_{i_t}^e = T\frac{i_t}{N_t}$$

where the pulsewindow function can be any one of a rectangular pulse window function, a linear pulse window function, or a BLACKMAN pulse window function, among others.

Thus, in some embodiments, the pulsewindow function may be equivalent to any one of the following three equations (2):

$$\text{window}^{rectangular}(t_{i_t}^s, t_{i_t}^e, t) = rect(t_{i_t}^s, t_{i_t}^e, t) \quad (2)$$

-continued
$$\text{window}^{linear}(t_{i_t}^s, t_{i_t}^e, t) = \left(1 - \left|\frac{2t - t_{i_t}^s - t_{i_t}^e}{t_{i_t}^e - t_{i_t}^s}\right|\right)rect(t_{i_t}^s, t_{i_t}^e, t)$$

$$\text{window}^{blackman}(t_{i_t}^s, t_{i_t}^e, t) =$$
$$\left(0.42 - 0.50\cos\left(2\pi\frac{(t - t_{i_t}^s)}{(t_{i_t}^e - t_{i_t}^s)}\right) + 0.08\cos\left(4\pi\frac{(t - t_{i_t}^s)}{(t_{i_t}^e - t_{i_t}^s)}\right)\right)rect(t_{i_t}^s, t_{i_t}^e, t)$$

In the window functions denoted by equations (1) and (2), $t^s$ is the start time of the window, $t^e$ is the end time of the window, $N_t$ is the number of time-divisions, and T is the listening time.

Equation (3) demonstrates how de-multiplexing can be performed:

$$V(i_t, i_r) = \frac{\int_0^T V(i_r, t)\text{testwindow}(t_{i_t}^s, t_{i_t}^e, t)\exp(i2\pi f_{i_t} t)dt}{\int_0^T \sin(i2\pi f_{i_t} t)\text{pulsewindow}(t_{i_t}^s, t_{i_t}^e, t)} \quad (3)$$
$$\text{testwindow}(t_{i_t}^s, t_{i_t}^e, t)\exp(i2\pi f_{i_t} t)dt$$

where the testwindow function represents processing that is applied to reduce aliasing, and the receivers are integrally indexed as $i_r$.

For embodiments that utilize only FDM, there is no time-division and hence $N_t=1$, with $f_i \neq f_j$ and $i \neq j$ (i.e., $f_i$ is mathematically unique). For embodiments that use only TDM, $N_t > 1$ and $f_i = f_j$, for all i and j. Mixed time/frequency-division embodiments (i.e., embodiments that utilize a combination of FDM and TDM) can be achieved by setting $N_t > 1$ and $f_i \neq f_j$, with $i \neq j$.

The result of using these concepts can be demonstrated via simulation. For example, a Laterolog tool with three transmitters that are operating using a single mode may be considered. The listening time is chosen to be 58.824 ms. To implement FDM, three different frequencies (e.g., 85, 119, 153 Hz) are selected. The amplitude of the first mode received signal is chosen to vary linearly between values of 0.5 and 1.0. The amplitude of the second mode received signal is chosen to vary linearly between values of 0.005 and 0.007. The amplitude of the third mode received signal is chosen to vary linearly between values of 0.003 and 0.001. The variations and amplitude levels are chosen as a model of the effect of tool movement in the presence of a high contrast boundary layer. To multiplex and de-multiplex these simulated signals, equations (1)-(3) are used.

FIGS. 7-10 illustrate pre-processing and post-processing views of the signals as a function of time and frequency. In these figures, the graphs labeled X10 (i.e., labeled 710, 810, 910, and 1010) illustrate the total received signal $V(i_r,t)$ and the ideal demultiplexed received signals corresponding to each mode in the time domain prior to windowing. It is noted that in real-world measurements, only the total signal is available. The graphs labeled X20 in FIGS. 7-10 illustrate the magnitude of the total and ideal multiplexed received signal in the frequency domain prior to windowing.

The graphs labeled X30 in FIGS. 7-10 illustrate the total received signal after windowing as $V(i_r,t)\text{testwindow}(t^s,t^e,t)$. The graphs labeled X40 in FIGS. 7-10 illustrate the magnitude of the received signal, using a logarithmic scale, after windowing.

The graphs labeled X50 in FIGS. 7-10 illustrate the received signal after windowing, in the frequency domain. The graphs labeled X60 in FIGS. 7-10 illustrate the extracted signal as $V(i_t, i_r)$, via equation (3), for each measurement (each frequency in FDM, and each window in TDM).

The expression "sum(Freq i)" in the legends indicates the sum of individual signals with the frequency index i. The expression "+ Window" is used to indicate the curve has been plotted after the testingwindow function is applied.

Figure 7:
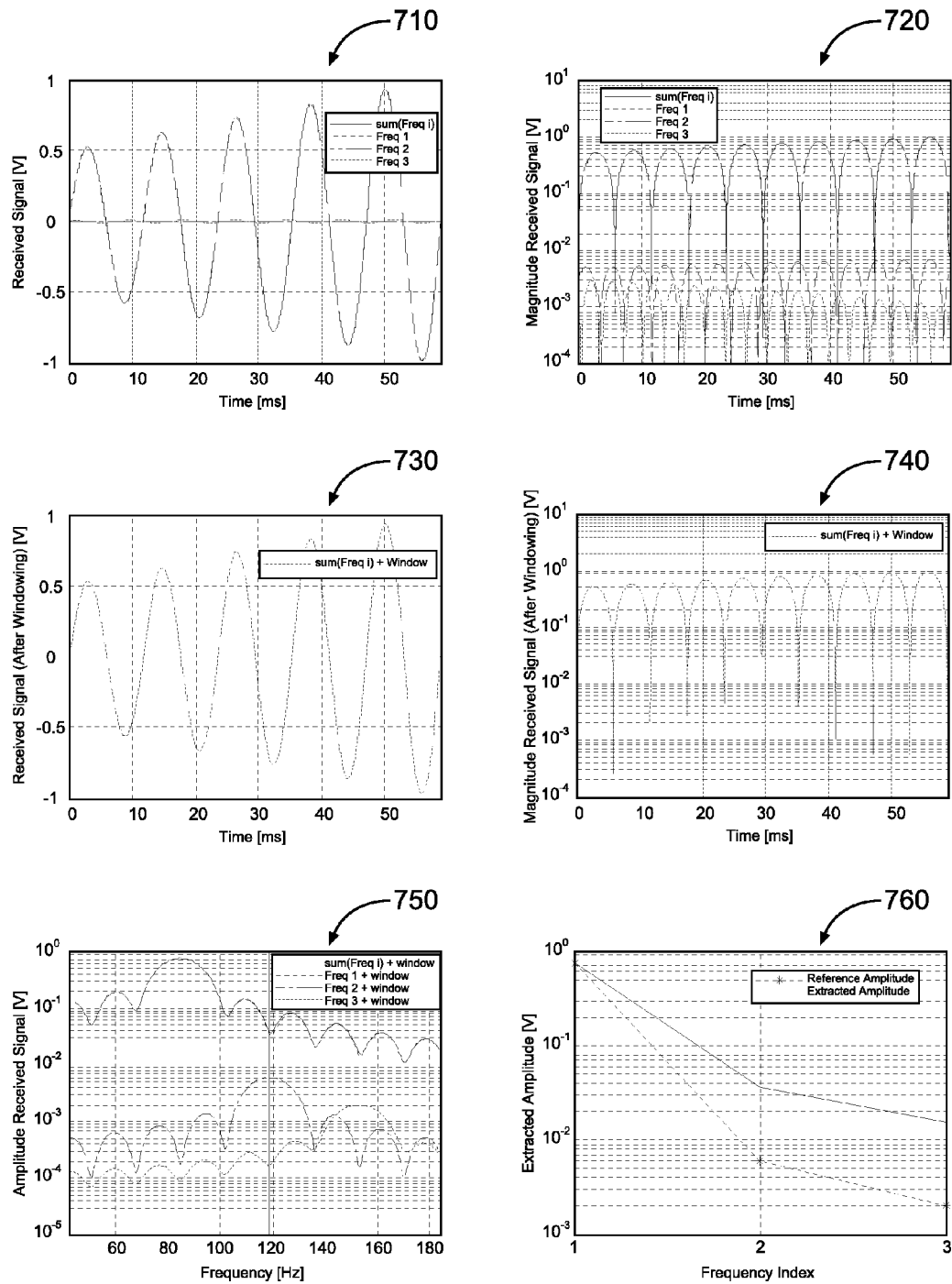
FIG. 7 includes a series of graphs illustrating received signals at various stages of processing, without a test window, according to various embodiments of the invention.

Thus, FIG. 7 includes a series of graphs 710, 720, 730, 740, 750, 760 illustrating received signals at various stages of processing, without a test window, according to various embodiments of the invention. Here the transmitted signal is characterized by FDM and a rectangular pulse window. In this case, graph 750 clearly shows that the amplitude of Frequency 1 is much larger than the amplitude of Frequency 2, so much so that Frequency 2 cannot be effectively measured due to interference from Frequency 1.

Figure 8:
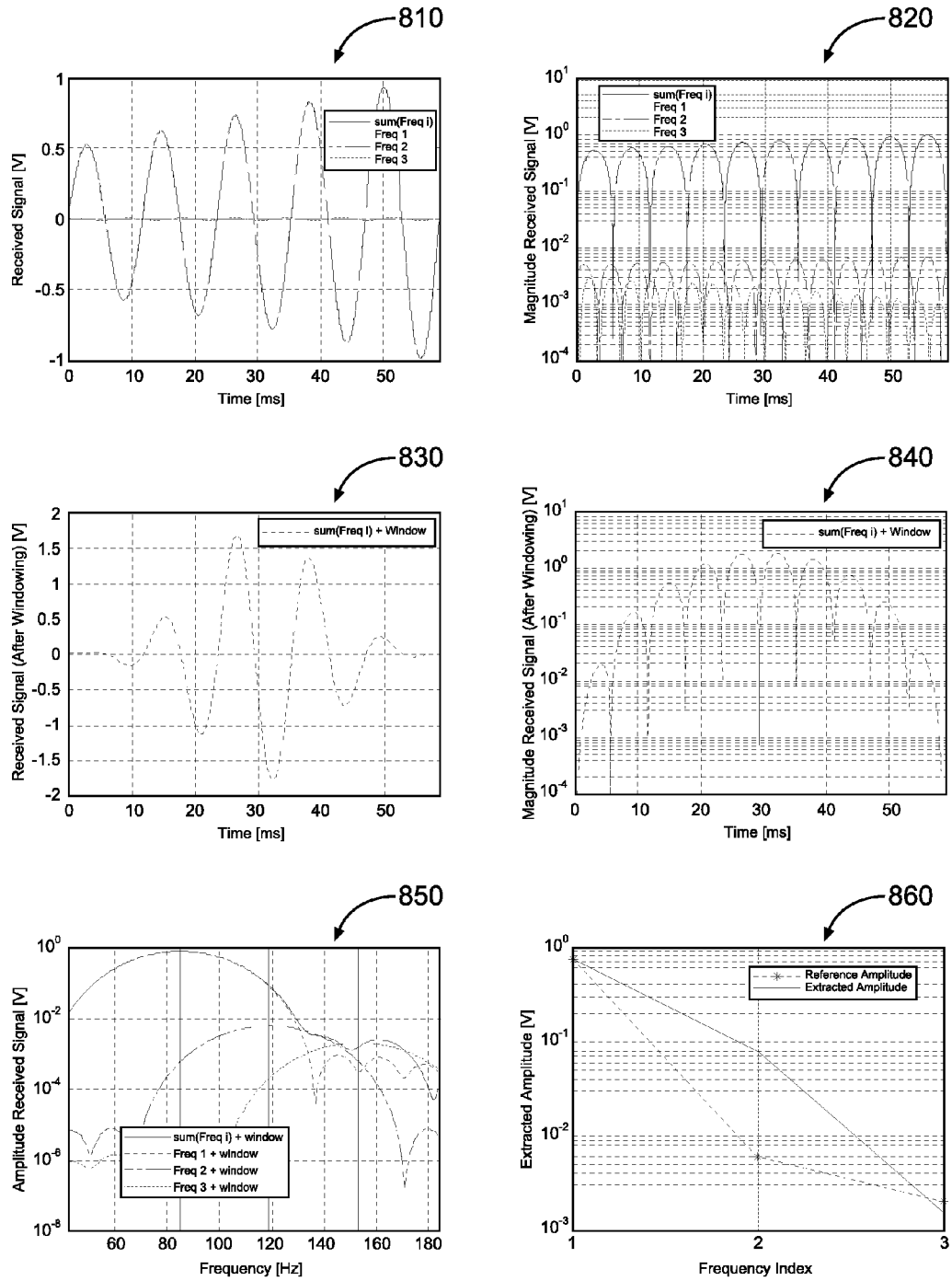
FIG. 8 includes a series of graphs illustrating received signals at various stages of processing, with a Blackman test window, according to various embodiments of the invention.

FIG. 8 includes a series of graphs 810, 820, 830, 840, 850, 860 illustrating received signals at various stages of processing, with a Blackman test window, according to various embodiments of the invention. Here the transmitted signal is characterized by FDM and a rectangular pulse window. Once again, the issue of interference is not resolved with great satisfaction. Graph 850 indicates that the amplitude of Frequency 1 amplitude is still much larger than the amplitude of Frequency 2, even though some improvement is obtained with respect to the amount of interference Frequency 1 causes for Frequency 3.

Generally, the use of different filters with a high band stop characteristic can reduce interference at close range, or at a longer range with a low band stop characteristic. However, when transmitter frequencies are not widely separated, this trade-off makes band-stop based filtering less effective.

Figure 9:
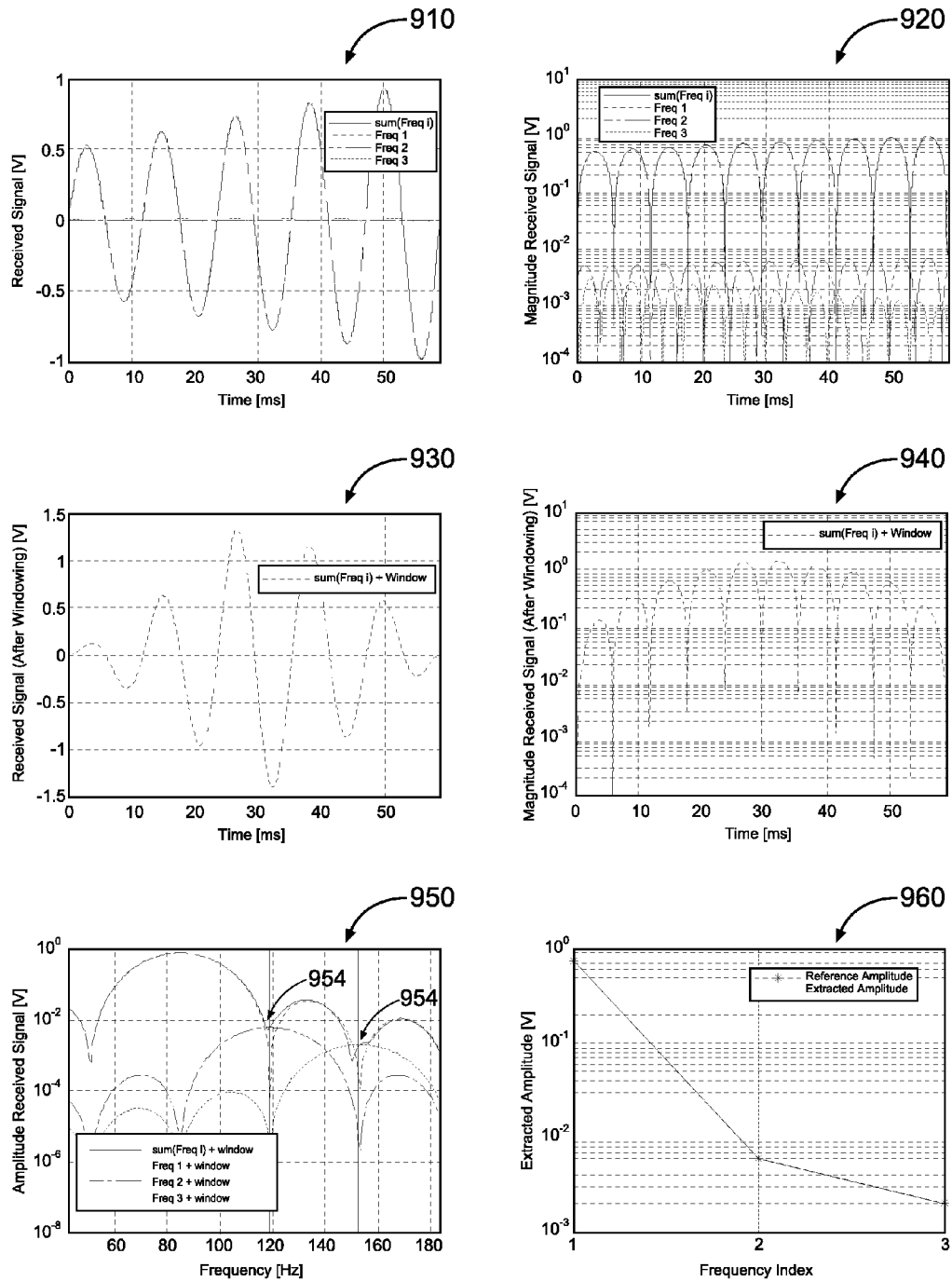
FIG. 9 includes a series of graphs illustrating received signals at various stages of processing, with a linear test window, according to various embodiments of the invention.

FIG. 9 includes a series of graphs 910, 920, 930, 940, 950, 960 illustrating received signals at various stages of processing, with a linear test window, according to various embodiments of the invention. Here the transmitted signal is characterized by FDM and a linear pulse window. In graph 950, the amplitude of Frequency 1 approaches the amplitudes of Frequency 2 and Frequency 3 at several dipping point 954 locations. As a result, the interference between modes is significantly reduced, even without the use of complex band-stop filters. In order to achieve this performance, operational frequencies should be selected to occur as close to the dipping points 954 as possible. This can be achieved if the frequencies are chosen as $f_i = (2N_i + 1)/T$, where $N_i$ are selected from integral values.

Figure 10:
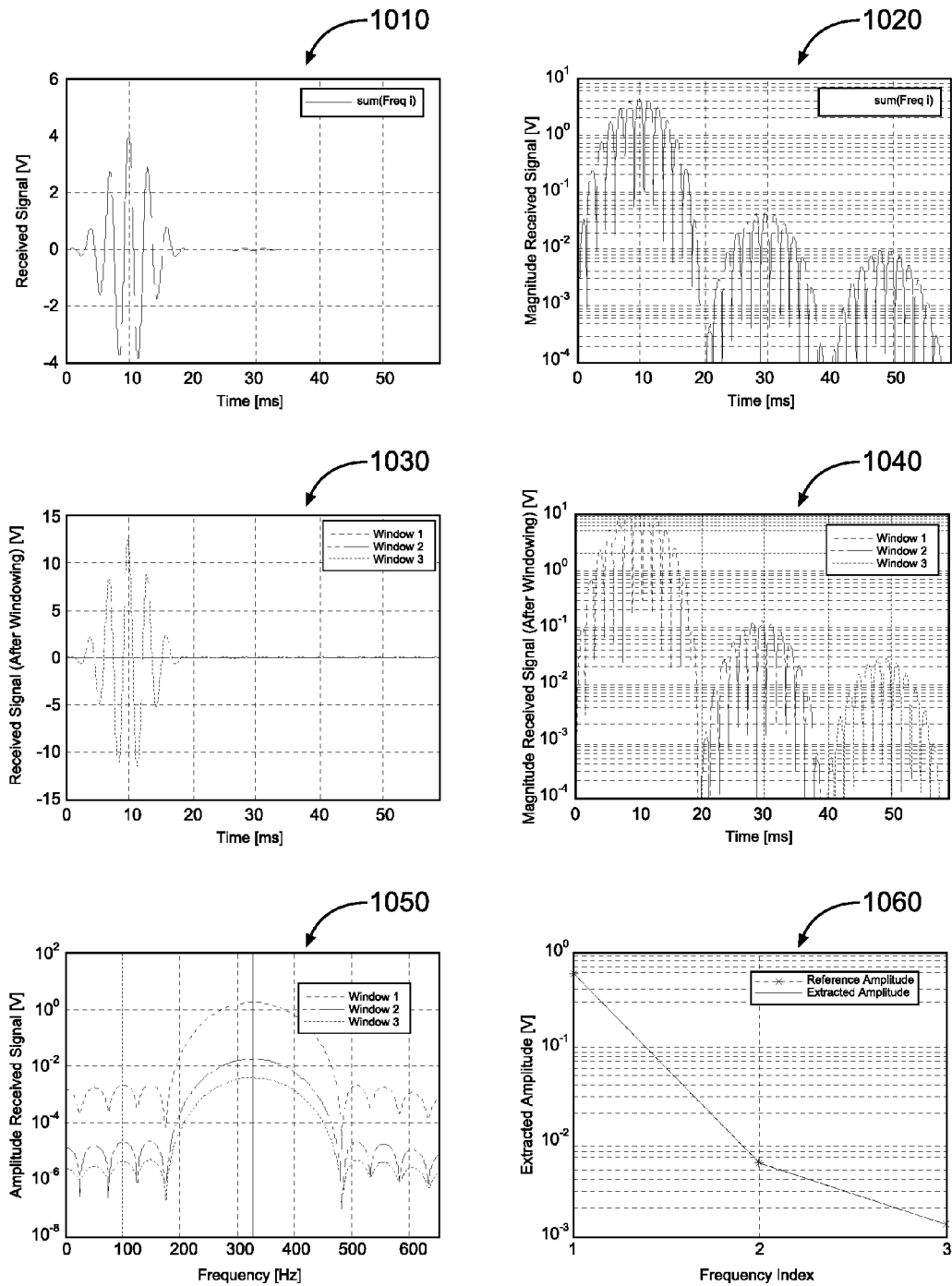
FIG. 10 includes a series of graphs illustrating received signals at various stages of processing, with a rectangular test window, according to various embodiments of the invention.

FIG. 10 includes a series of graphs 1010, 1020, 1030, 1040, 1050, 1060 illustrating received signals at various stages of processing, with a rectangular test window, according to various embodiments of the invention. Here the transmitted signal is characterized by TDM and a Blackman pulse window. Graph 1040 indicates that all modes are decoupled in time via the use of windows. Extracted signal results in graph 1060 show that TDM embodiments can significantly reduce interference. One advantage of TDM embodiments over linear window embodiments is that, while the linear window method achieves limited interference reduction that is sensitive to non-linearity problems in the excitation signal shape, TDM can achieve a greater reduction—one that is even more insensitive to non-linearity problems.

To summarize, the graphs labeled in FIGS. 7-10 show that FDM embodiments, and TDM embodiments with a linear window can achieve a significant reduction in signal interference.

Figure 11:
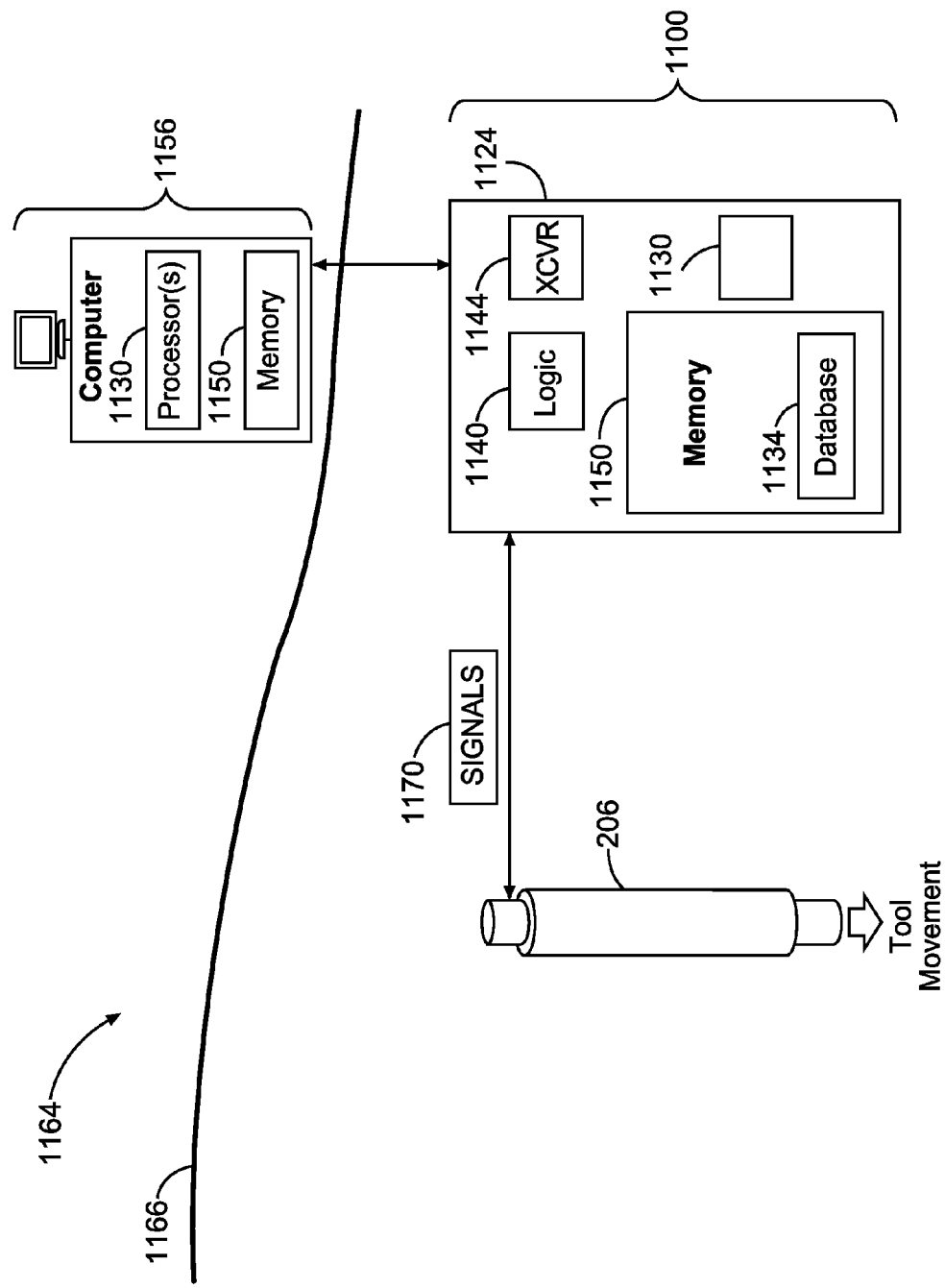
FIG. 11 is a block diagram of apparatus and systems according to various embodiments of the invention.

FIG. 11 is a block diagram of apparatus 1100 and systems 1164 according to various embodiments of the invention. The apparatus 1100 may comprise any one or more of the apparatus 200, 210, 220, 300, 310 shown in FIGS. 2 and 3, respectively. The apparatus 1100 may include any of the schematic elements shown in FIG. 4, as well as any or all of the components of the data acquisition system 1124.

Thus, referring to FIGS. 2-4 and 11, it can be seen that in some embodiments an apparatus 1100 includes a housing 206. The housing 206 might take the form of a wireline tool body, or a down hole tool. Processor(s) 1130 within the apparatus 1100 may be located at the surface 1166, as part of a workstation 1156 (e.g., as part of a surface logging facility), or in a data acquisition system 1124, which may be above or below the Earth's surface 1166 (e.g., attached to the housing 206).

An apparatus 1100 may further comprise a data transceiver 1144 (e.g., a telemetry transmitter and/or receiver) to transmit signals 1170 (e.g., interacted signals, or processed versions of the interacted signals, or both) from the apparatus 1100 to the workstation 1156. Logic 1140 can be used to generate signals that interact with a surrounding formation, as well as to acquire the resulting interacted signals, according to the various methods described herein. Signals 1170, as well as other data, can be stored in the memory 1150, perhaps as part of a database 1134.

Thus, referring now to FIGS. 1-11, it can be seen that many embodiments may be realized, including an apparatus 1100 or a system 1164 that comprises a galvanic tool housing 206 and current electrodes 302 attached to the housing 206. The system 1164 may further comprise a processor 1130 to control transmission of energy from the current electrodes 302, to multiplex the energy in both time and frequency domains to interact with a geological formation, to provide interacted signals that represent a formation property. As used herein, the term "galvanic tool housing" means a housing configured to attach at least four electrodes that operate primarily as electric monopoles, current injectors, or current returns.

The current electrodes may be formed as symmetric electrodes, including being formed as rings around the longitudinal axis of the housing, to propagate the transmitted energy in drilling fluid, as shown in FIG. 2A. Thus, the current electrodes 302 may comprise axis symmetric electrodes.

The current electrodes may be mounted to pads, to be applied to the casing of a borehole, as shown in FIG. 2B. Thus, the current electrodes 302 may comprise padded elements.

A down hole tool or a wireline tool may be used to house the transmitters, as shown in FIGS. 2A and 2B. Thus, the housing 206 may comprise one of a wireline tool housing or a down hole tool housing.

A Laterolog tool may be used to house the transmitters, as shown in FIG. 3A. Thus, the housing 206 may comprise a Laterolog tool housing.

The current electrodes may be controlled in a number of ways. For example, the current electrodes 302 may be current-controlled or voltage-controlled.

The operation of the signal transmitters may be controlled by a processor down hole, or in a surface data processing facility. Thus, the processor(s) in the apparatus 1100 or system 1164 may be attached to the housing 206, a workstation 1156, or both, depending on where various commands are generated, and calculations are made. That is, processing during various activities conducted by the system 1164 may be conducted both down hole and at the surface 1166. In this case, the processor 1130 may comprise multiple computational units, some located down hole, and some at the surface 1166. Additional embodiments may be realized, and thus, some additional examples of systems will now be described.

Figure 12:
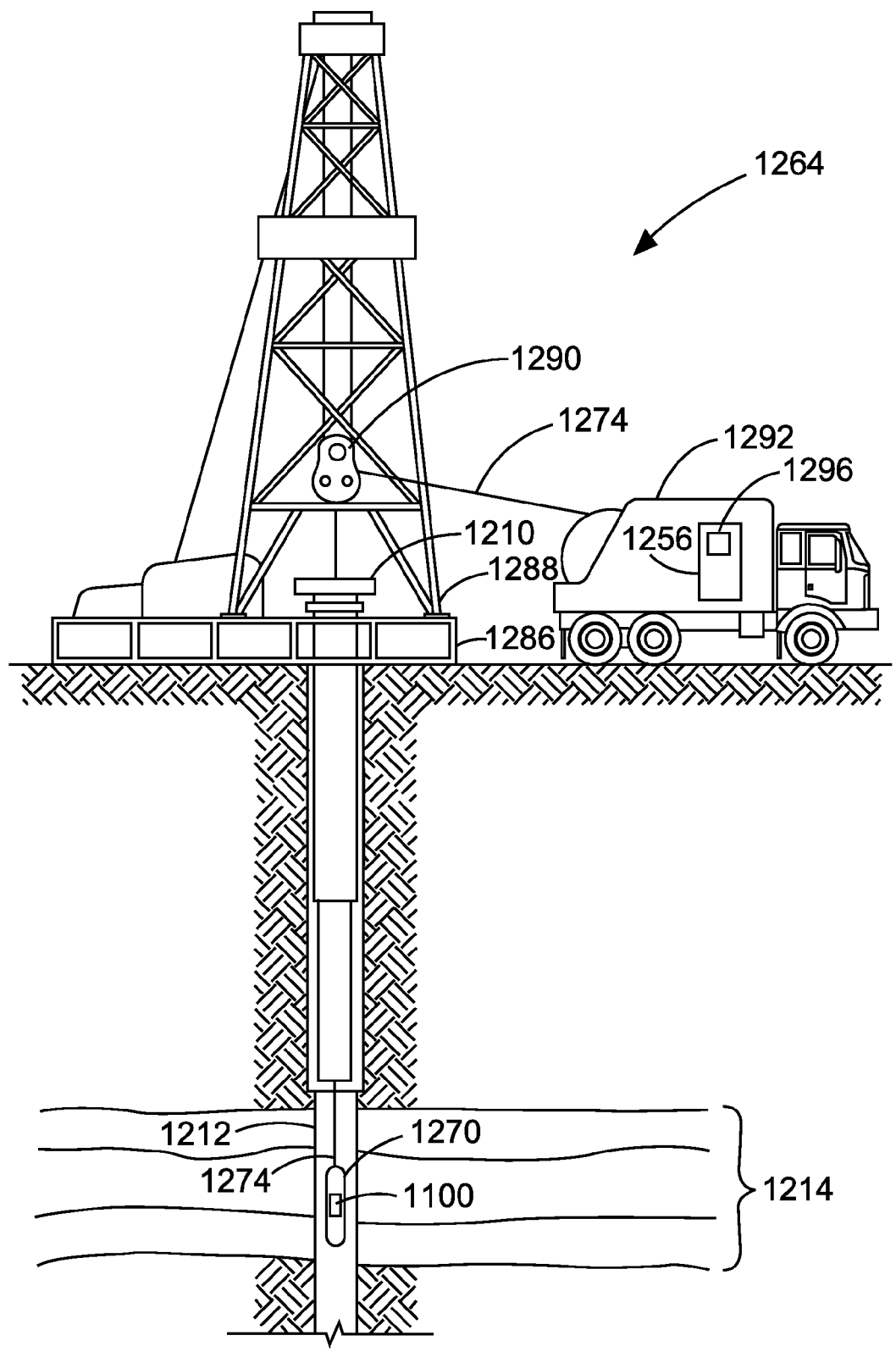
FIG. 12 illustrates a wireline system embodiment of the invention.
Figure 13:
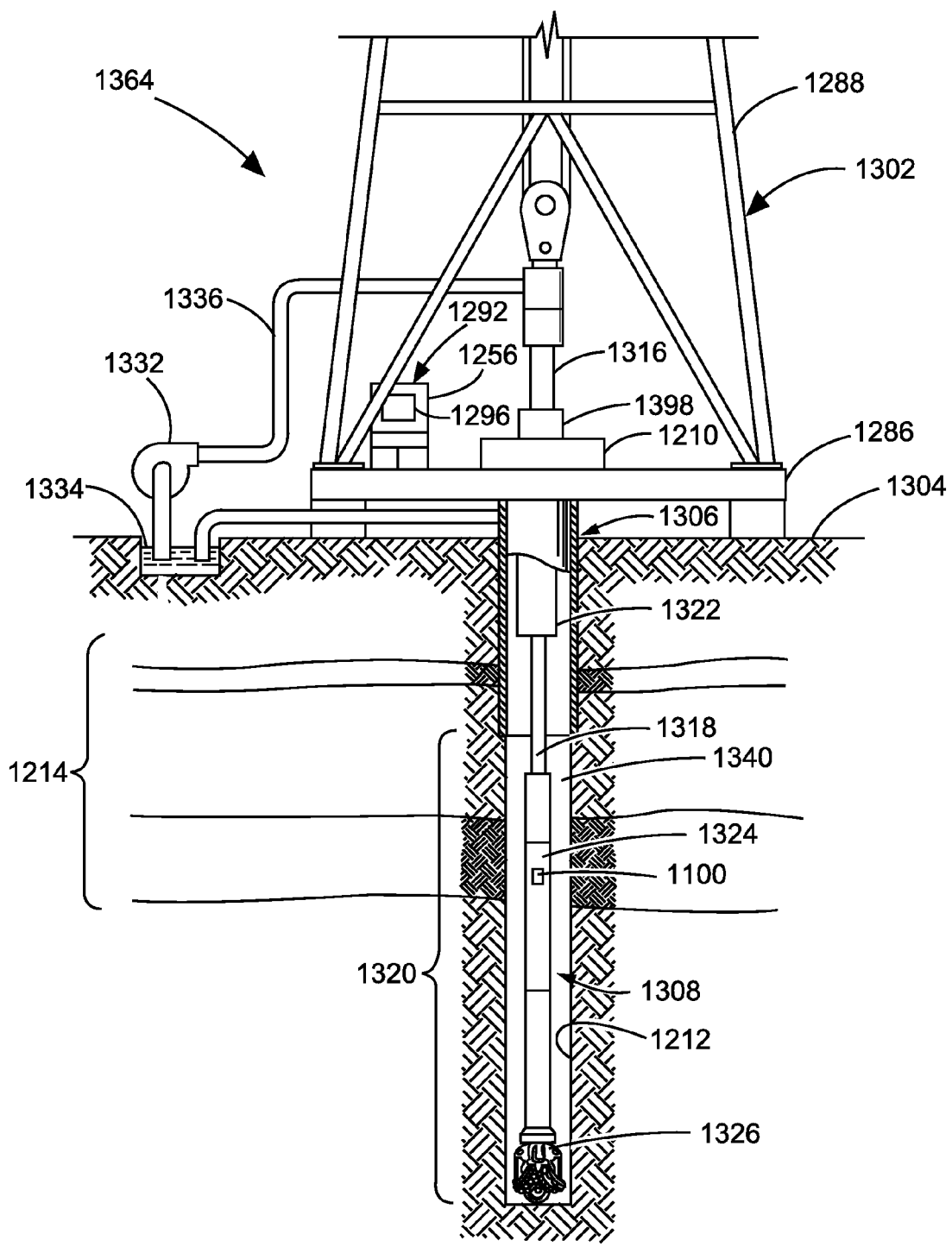
FIG. 13 illustrates a drilling rig system embodiment of the invention.

FIG. 12 illustrates a wireline system 1264 embodiment of the invention, and FIG. 13 illustrates a drilling rig system 1364 embodiment of the invention. Therefore, the systems 1264, 1364 may comprise portions of a wireline logging tool body 1270 as part of a wireline logging operation, or of a down hole tool 1324 as part of a down hole drilling operation.

Referring now to FIG. 12, a well during wireline logging operations can be seen. In this case, a drilling platform 1286 is equipped with a derrick 1288 that supports a hoist 1290. Any one or more of these components, as well as a logging cable 1274, may serve as a movement mechanism to move thermal sources and/or thermal receivers.

Drilling oil and gas wells is commonly carried out using a string of drill pipes connected together so as to form a drilling string that is lowered through a rotary table 1210 into a wellbore or borehole 1212. Here it is assumed that the drilling string has been temporarily removed from the borehole 1212 to allow a wireline logging tool body 1270, such as a probe or sonde, to be lowered by wireline or logging cable 1274 into the borehole 1212. Typically, the wireline logging tool body 1270 is lowered to the bottom of the region of interest and subsequently pulled upward at a substantially constant speed.

During the upward trip, at a series of depths various instruments (e.g., portions of the apparatus 1100, or system 1164 shown in FIG. 11) included in the tool body 1270 may be used to perform measurements on the subsurface geological formations 1214 adjacent the borehole 1212 (and the tool body 1270). The measurement data can be communicated to a surface logging facility 1292 for processing, analysis, and/or storage. The logging facility 1292 may be provided with electronic equipment for various types of signal processing, which may be implemented by any one or more of the components of the apparatus 1100 or system 1164 in FIG. 11. Similar formation evaluation data may be gathered and analyzed during drilling operations (e.g., during LWD operations, and by extension, sampling while drilling).

In some embodiments, the tool body 1270 is suspended in the wellbore by a wireline cable 1274 that connects the tool to a surface control unit (e.g., comprising a workstation 1256). The tool may be deployed in the borehole 1212 on coiled tubing, jointed drill pipe, hard wired drill pipe, or any other suitable deployment technique.

Turning now to FIG. 13, it can be seen how a system 1364 may also form a portion of a drilling rig 1302 located at the surface 1304 of a well 1206. The drilling rig 1302 may provide support for a drill string 1308. The drill string 1308 may operate to penetrate the rotary table 1210 for drilling the borehole 1212 through the subsurface formations 1214. The drill string 1308 may include a Kelly 1316, drill pipe 1318, and a bottom hole assembly 1320, perhaps located at the lower portion of the drill pipe 1318.

The bottom hole assembly 1320 may include drill collars 1322, a down hole tool 1324, and a drill bit 1326. The drill bit 1326 may operate to create the borehole 1212 by penetrating the surface 1304 and the subsurface formations 1214. The down hole tool 1324 may comprise any of a number of different types of tools including measurement while drill (MWD) tools, LWD tools, and others.

During drilling operations, the drill string 1308 (perhaps including the Kelly 1316, the drill pipe 1318, and the bottom hole assembly 1320) may be rotated by the rotary table 1210. Although not shown, in addition to, or alternatively, the bottom hole assembly 1320 may also be rotated by a motor (e.g., a mud motor) that is located down hole. The drill collars 1322 may be used to add weight to the drill bit 1326. The drill collars 1322 may also operate to stiffen the bottom hole assembly 1320, allowing the bottom hole assembly 1320 to transfer the added weight to the drill bit 1326, and in turn, to assist the drill bit 1326 in penetrating the surface 1304 and subsurface formations 1214.

During drilling operations, a mud pump 1332 may pump drilling fluid (sometimes known by those of ordinary skill in the art as "drilling mud") from a mud pit 1334 through a hose 1336 into the drill pipe 1318 and down to the drill bit 1326. The drilling fluid can flow out from the drill bit 1326 and be returned to the surface 1304 through an annular area 1340 between the drill pipe 1318 and the sides of the borehole 1212. The drilling fluid may then be returned to the mud pit 1334, where such fluid is filtered. In some embodiments, the drilling fluid can be used to cool the drill bit 1326, as well as to provide lubrication for the drill bit 1326 during drilling operations. Additionally, the drilling fluid may be used to remove subsurface formation cuttings created by operating the drill bit 1326.

Thus, referring now to FIGS. 1-13, it may be seen that in some embodiments, the systems 1264, 1364 may include a drill collar 1322, a down hole tool 1324, and/or a wireline logging tool body 1270 to house one or more apparatus 1100, similar to or identical to the apparatus 1100 described above and illustrated in FIG. 11. Components of the system 1164 in FIG. 11 may also be housed by the tool 1324 or the tool body 1270.

Thus, for the purposes of this document, the term "housing" may include any one or more of a drill collar 1322, a down hole tool 1324, or a wireline logging tool body 1270 (all having an outer surface, to enclose or attach to magnetometers, sensors, fluid sampling devices, pressure measurement devices, temperature measurement devices, transmitters, receivers, electrodes, antennas, acquisition and processing logic, and data acquisition systems). The tool 1324 may comprise a down hole tool, such as an LWD tool or MWD tool. The wireline tool body 1270 may comprise a wireline logging tool, including a probe or sonde, for example, coupled to a logging cable 1274. Many embodiments may thus be realized.

For example, in some embodiments, a system 1264, 1364 may include a display 1296 to present information, such as signals 1170, included interacted signals, and processed versions of the interacted signals, as well as database information, perhaps in graphic form. A system 1264, 1364 may also include computation logic, perhaps as part of a surface logging facility 1292, or a computer workstation 1256, to receive signals from transmitters and to send signals to receivers, and other instrumentation to determine properties of the formation 1214.

Thus, a system 1264, 1364 may comprise a down hole tool body, such as a wireline logging tool body 1270 or a down hole tool 1324 (e.g., an LWD or MWD tool body), and portions of one or more apparatus 1100 attached to the tool body, the apparatus 1100 to be constructed and operated as described previously. The processor(s) 1130 in the systems 1264, 1364 may be attached to the housing 206, or located at the surface 1166, 1304 as part of a surface computer (e.g., in a workstation 1156 that forms part of a surface logging facility in FIG. 11).

The apparatus 200, 210, 220, 300, 310, 1100; electrodes 302, 304; housing 206; transmitter antennas 312; receiver antennas 314; systems 410, 1164, 1264, 1364; control center 414; signal generator 418; transmitters 422; receivers 434; data buffer 438; data acquisition system 1124; processors 1130; database 1134; logic 1140; transceiver 1144; memory 1150; workstations 1156, 1256; surface 1166; signals 1170; display 1196; rotary table 1210; borehole 1212; wireline logging tool body 1270; logging cable 1274; drilling platform 1286; derrick 1288; hoist 1290; logging facility 1292; drill string 1308; Kelly 1316; drill pipe 1318; bottom hole assembly 1320; drill collars 1322; down hole tool 1324; drill bit 1326; mud pump 1332; mud pit 1334; and hose 1336 may all be characterized as "modules" herein.

Such modules may include hardware circuitry, and/or a processor and/or memory circuits, software program modules and objects, and/or firmware, and combinations thereof, as desired by the architect of the apparatus 1100 and systems 1164, 1264, 1364 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 1100 and systems 1164, 1264, 1364 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools, and smart transducer interface node telemetry systems, among others. Some embodiments include a number of methods.

Figure 14:
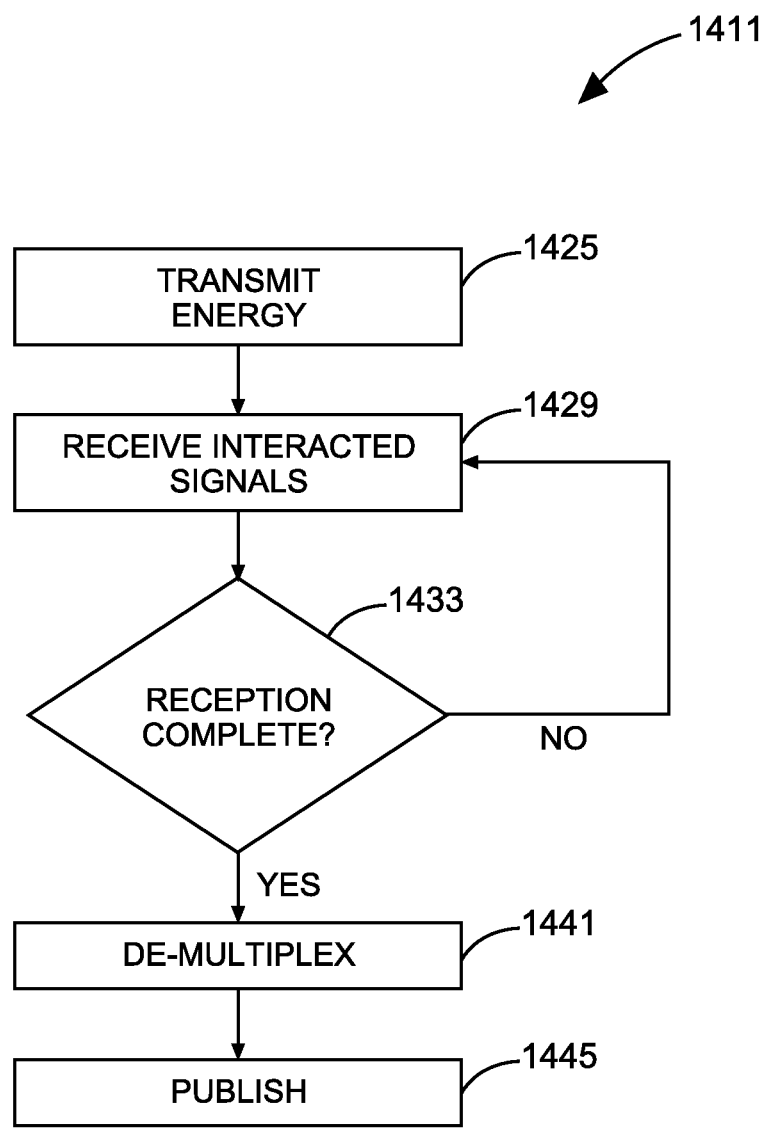
FIG. 14 is a flow chart illustrating several methods according to various embodiments of the invention.

For example, FIG. 14 is a flow chart illustrating several methods 1411 according to various embodiments of the invention. For example, one method 1411 may comprise transmitting energy into a formation, using time and frequency domain multiplexing. Interacted, received signals can be interpreted to provide formation properties.

Thus, in some embodiments, a processor-implemented method 1411, to execute on one or more processors that perform the method 1411, begins at block 1421 with transmitting energy as transmitted signals from current electrodes on a galvanic down hole tool, while multiplexing the energy in both time and frequency domains, to interact the transmitted signals with a geological formation to provide interacted signals that represent a formation property.

The energy provided by the set of current electrodes can be formed by activating individual transmitters, in combination, over time, and over frequency. Thus, the activity at block 1425 may comprise pulsing the current electrodes as a combination of the transmitted signals with different frequencies and different pulse time windows.

The amplitude of the transmitted signals may vary according to a windowed function. Thus, the amplitude of the transmitted signals may be based, in part, on a windowed function of time that comprises the different pulse time windows.

The types of windows that may be applied are numerous, and may depend on the type of interaction between the transmitted signals that is expected to occur in a given formation. Thus, the windowed function of time may comprise one of a rectangular window, a linear window, or a Blackman window.

The amplitude of the transmitted signals may vary according to a sinusoidal function. Thus, the amplitude of the transmitted signals may be based, in part, on a sinusoidal function of phase of the transmitted signals.

As explained previously, the process of multiplexing the signals from individual transmitters may be governed by a formula. For example, the amplitude of the transmitted signals $S(i_t,t)$ may vary over time t, and over an indexed number of transmitters N, from i=1 to N, according to the formula: $S(i_t,t)=\text{pulsewindow}(t_{i_t}^s, t_{i_t}^e,t)\sin(2\pi f_{i_t}t+\phi_{i_t})$, wherein $$t_{i_t}^s = T\frac{i_t - 1}{N_t} \text{ and } t_{i_t}^e = T\frac{i_t}{N_t},$$

such that $N_t$ is a number of time divisions ($N_e>1$) in an overall listening time period T. The $\text{pulsewindow}(t_{i_t}^s, t_{i_t}^e,t)$ may comprise a windowed function of transmitter $i_t$ start time $t^s$, transmitter $i_t$ end time $t^e$, and time t; and the function $\sin(2\pi f_{i_t}t+\phi_{i_t})$ may be a sinusoidal function of frequency $2\pi f_{i_t}$ of transmitter $i_t$, phase $\phi_{i_t}$ of transmitter $i_t$, and time t, over an indexed number of transmitters $i_t$ from 1 to N. In some embodiments, the transmitters are sufficiently separated from each other in time or frequency to permit demultiplexing the received signals with a selected degree of accuracy. For example, each of two transmitters might be selected to have a different time window range, or to operate on a different frequency $f_i$.

In some embodiments, the interacted signals may be received as a combination of modes. Thus, the method 1411 may comprise, at block 1429, receiving the interacted signals as a simultaneous combination of modes, wherein the combination occurs in the time and the frequency domains.

At block 1433, a determination is made as to whether reception of the interacted signals is complete. If so, the method 1411 continues on to block 1441. If not, the method 1411 may return to block 1429.

Once the interacted signals are received, they may be de-multiplexed. That is, the transmitted signals, multiplexed in time and frequency and directed into the formation to form interacted signals, can be received and de-multiplexed, to separate combinations of modes. Thus, the method 1411 may include, at block 1441, de-multiplexing the interacted signals to separate the modes.

The process of de-multiplexing at block 1441 may therefore include de-multiplexing the interacted signals into received signals $V(i_t,i_r)$ for transmitters $i_t$ and receivers $i_r$ according to the formula:

$$V(i_t, i_r) = \frac{\int_0^T V(i_r, t)\text{testwindow}(t_{i_t}^s, t_{i_t}^e, t)\exp(i2\pi f_{i_t}t)dt}{\int_0^T \sin(i2\pi f_{i_t}t)\text{pulsewindow}(t_{i_t}^s, t_{i_t}^e, t)},$$

$\text{testwindow}(t_{i_t}^s, t_{i_t}^e, t)\exp(i2\pi f_{i_t}t)dt$ wherein $V(i_r,t)$testwindow$(t_{i_t}^s, t_{i_t}^e, t)$ is a function of the received voltage provided by receiver $i_r$ at time t, over a number of receivers i=1 to M, multiplied by a first windowed function of transmitter $i_t$ start time $t^s$, transmitter $i_t$ end time $t^e$, and time t; wherein pulsewindow$(t_{i_t}^s, t_{i_t}^e, t)$ is a second windowed function of transmitter $i_t$ start time $t^s$, transmitter $i_t$ end time $t^e$, and time t; and wherein exp$(i2\pi f_{i_t}t)$ dt is an exponential function of index i, frequency $2\pi f_{i_t}$ of transmitter $i_t$, and time t, over an indexed number of transmitters $i_t$ from 1 to N.

The windowed functions that govern multiplexing and de-multiplexing, may be the same, or different. Thus, the first windowed function used as part of the activity in block 1441 may be different from the second windowed function used in block 1441.

The separated modes can be displayed to an operator, as an image, including a color-coded graph. Thus, the method 1411 continue on to block 1445 to include publishing an image of the separated modes on a surface computer. Formation properties may be derived from the de-multiplexed, interacted signals, and published to the display as well.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 5 and 14) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 15:
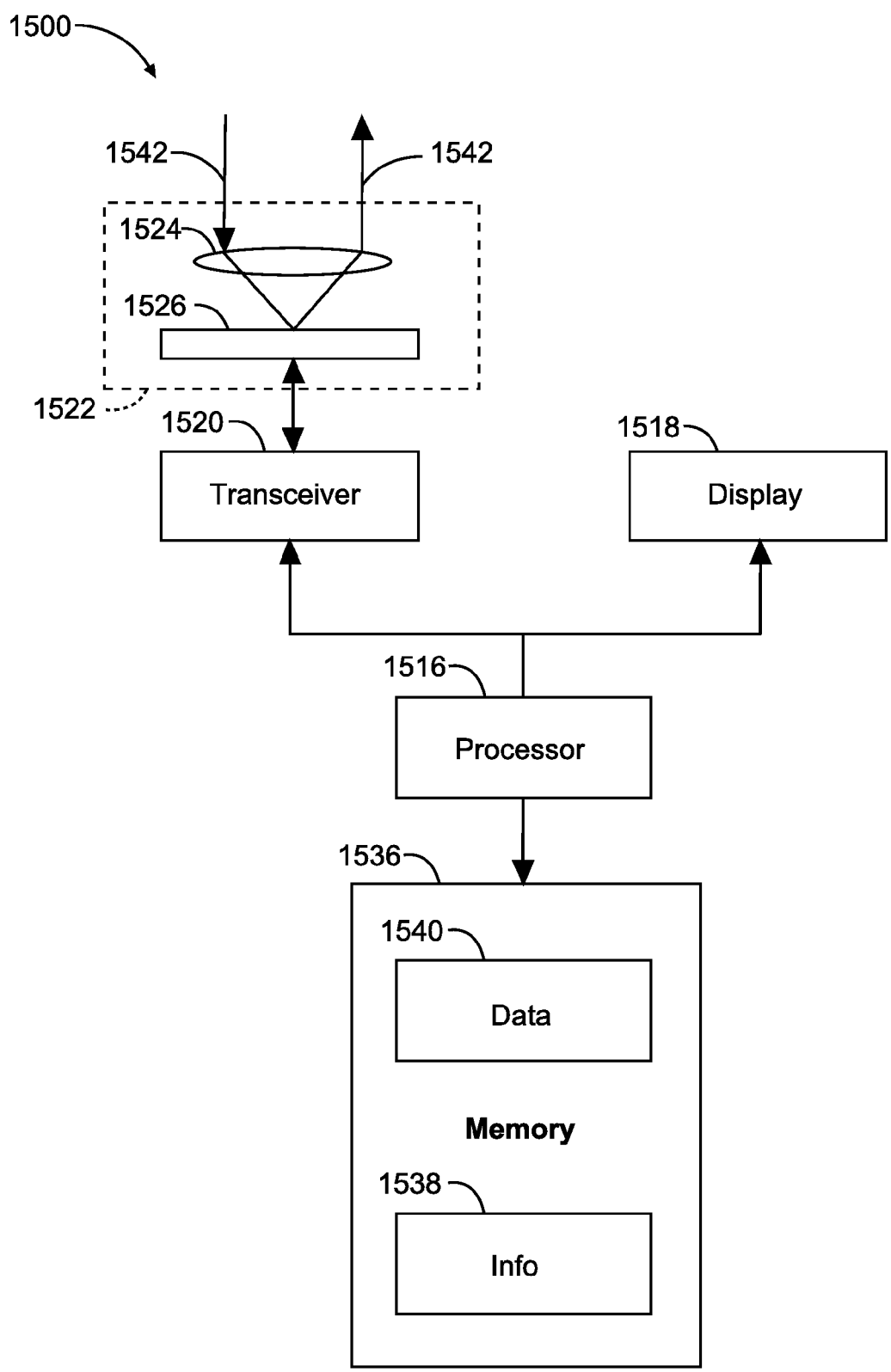
FIG. 15 is a block diagram of an article according to various embodiments of the invention.

For example, FIG. 15 is a block diagram of an article 1500 of manufacture according to various embodiments, such as a computer, a memory system, a magnetic or optical disk, or some other storage device. The article 1500 may include one or more processors 1516 coupled to a machine-accessible medium such as a memory 1536 (e.g., removable storage media, as well as any tangible, non-transitory memory including an electrical, optical, or electromagnetic conductor) having associated information 1538 (e.g., computer program instructions and/or data), which when executed by one or more of the processors 1516, results in a machine performing any actions described with respect to the methods of FIGS. 5 and 14, the apparatus of FIGS. 2-3 and 11, and the systems of FIGS. 4 and 11-13. The processors 1516 may comprise one or more processors sold by Intel Corporation (e.g., Intel® Core™ processor family), Advanced Micro Devices (e.g., AMD Athlon™ processors), and other semiconductor manufacturers.

In some embodiments, the article 1500 may comprise one or more processors 1516 coupled to a display 1518 to display data processed by the processor 1516 and/or a wireless transceiver 1520 (e.g., a down hole telemetry transceiver) to receive and transmit data processed by the processor.

The memory system(s) included in the article 1500 may include memory 1536 comprising volatile memory (e.g., dynamic random access memory) and/or non-volatile memory. The memory 1536 may be used to store data processed by the processor 1516, according to stored instructions forming part of the information 1538.

In various embodiments, the article 1500 may comprise communication apparatus 1522, which may in turn include amplifiers 1526 (e.g., preamplifiers or power amplifiers) and one or more antenna 1524 (e.g., transmitting antennas and/or receiving antennas). Signals 1542 received or transmitted by the communication apparatus 1522 may be processed according to the methods described herein.

Many variations of the article 1500 are possible. For example, in various embodiments, the article 1500 may comprise a down hole tool, including the apparatus 1100 shown in FIG. 11. In some embodiments, the article 1500 is similar to or identical to the apparatus 1100 or system 1164 shown in FIG. 11.

In summary, the apparatus, systems, and methods disclosed herein may operate to significantly improve acquired down hole signal quality by reducing interference between different measurements. This may in turn increase the operating resistivity range of array tools, allow higher resolution logs in high contrast environments, and deliver higher quality service to customers via more accurate evaluation of formations. As a result, the value of the services provided by an operation/exploration company may be enhanced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A processor-implemented method, to execute on one or more processors that perform the method, comprising:
   transmitting energy as transmitted signals from current electrodes on a galvanic down hole tool, while multiplexing the energy in both time and frequency domains, to interact the transmitted signals with a geological formation to provide interacted signals that represent a formation property; and
   pulsing the current electrodes as a combination of the transmitted signals with different frequencies and different pulse time windows, wherein an amplitude of the transmitted signals is based, in part, on a windowed function of time that comprises the different pulse time windows.

2. The method of claim 1, wherein the windowed function of time comprises one of a rectangular window, a linear window, or a Blackman window.

3. A processor-implemented method, to execute on one or more processors that perform the method, comprising:
   transmitting energy as transmitted signals from current electrodes on a galvanic down hole tool, while multiplexing the energy in both time and frequency domains, to interact the transmitted signals with a geological formation to provide interacted signals that represent a formation property; and
   pulsing the current electrodes as a combination of the transmitted signals with different frequencies and different pulse time windows, wherein an amplitude of the transmitted signals is based, in part, on a sinusoidal function of phase of the transmitted signals.

4. A processor-implemented method, to execute on one or more processors that perform the method, comprising:
   transmitting energy as transmitted signals from current electrodes on a galvanic down hole tool, while multiplexing the energy in both time and frequency domains, to interact the transmitted signals with a geological formation to provide interacted signals that represent a formation property; and
   pulsing the current electrodes as a combination of the transmitted signals with different frequencies and different pulse time windows, wherein an amplitude of the transmitted signals $S(i,t)$ varies over time t, and over an indexed number of transmitters N, from i=1 to N, according to the formula:

$$S(i_t,t) = \text{pulsewindow}(t_{i_t}^s, t_{i_t}^e, t)\sin(2\pi f_{i_t}t + \phi_{i_t}),$$

wherein $$t_{i_t}^s = T\frac{i_t - 1}{N_t} \text{ and } t_{i_t}^e = T\frac{i_t}{N_t},$$

such that $N_t$ is a number of time divisions ($N_t>1$) in an overall listening time period T;
wherein pulsewindow $(t_{i_t}^s, t_{i_t}^e, t)$ is a windowed function of transmitter $i_t$ start time $t^s$, transmitter $i_t$ end time $t^e$, and time t; and
wherein $\sin(2\pi f_{i_t}t+\phi_{i_t})$ is a sinusoidal function of frequency $2\pi f_{i_t}$ of transmitter $i_t$, phase $\phi_{i_t}$, of transmitter $i_t$, and time t, over an indexed number of transmitters $i_t$ from 1 to N.

5. A processor-implemented method, to execute on one or more processors that perform the method, comprising:
   transmitting energy as transmitted signals from current electrodes on a galvanic down hole tool, while multiplexing the energy in both time and frequency domains, to interact the transmitted signals with a geological formation to provide interacted signals that represent a formation property;
   receiving the interacted signals as a simultaneous combination of modes, wherein the combination occurs in the time and the frequency domains; and
   de-multiplexing the interacted signals into received signals $V(i_t,i_r)$ for transmitters it and receivers $i_r$ according to the formula $$V(i_t, i_r) = \frac{\int_0^T V(i_r, t)\text{testwindow}(t_{i_t}^s, t_{i_t}^e, t)\exp(i2\pi f_{i_t}t)dt}{\int_0^T \sin(2\pi f_{i_t}t)\text{pulsewindow}(t_{i_t}^s, t_{i_t}^e, t)}$$
$$\text{testwindow}(t_{i_t}^s, t_{i_t}^e, t)\exp(i2\pi f_{i_t}t)dt$$

wherein $V(i_r,t)$ testwindow$(t_{i_t}^s,t_{i_t}^e,t)$ is a function of the received voltage provided by receiver $i_r$ at time t, over a number of receivers i=1 to M, multiplied by a first windowed function of transmitter $i_t$ start time $t^s$, transmitter $i_t$ end time $t^e$, and time t;
wherein pulsewindow$(t_{i_t}^s, t_{i_t}^e,t)$ is a second windowed function of transmitter $i_t$ start time $t^s$, transmitter $i_t$ end time $t^e$, and time t; and
wherein $\exp(i2\pi f_{i_t}t)dt$ is an exponential function of index i, frequency $2\pi f$, of transmitter $i_t$, and time t, over an indexed number of transmitters it from 1 to N.

6. The method of claim 5, wherein the first windowed function is different from the second windowed function.

7. The method of claim 5, wherein one of the first windowed function or the second windowed function comprises a linear function.

* * * * *